Oct. 17, 1950     E. G. FORSSELL     2,525,885

FRICTION SHOCK ABSORBER FOR RAILWAY CAR TRUCKS

Filed Oct. 14, 1948

Inventor:
Eric G. Forssell.
By Henry Fuchs.
Atty.

Patented Oct. 17, 1950

2,525,885

UNITED STATES PATENT OFFICE 2,525,885

FRICTION SHOCK ABSORBER FOR RAILWAY CAR TRUCKS

Eric G. Forssell, Kenmore, N. Y., assignor to W. H. Miner, Inc., Chicago, Ill., a corporation of Delaware Application October 14, 1948, Serial No. 54,507

5 Claims. (Cl. 267—9)

This invention relates to improvements in friction shock absorbers, especially adapted for use in connection with railway car trucks for snubbing the action of the truck springs.

One object of the invention is to provide a friction shock absorber, adapted to be substituted for one or more of the spring units of a cluster of truck springs of a railway car, comprising relatively slidable friction elements and spring means opposing relative sliding movement of said elements, wherein the spring means also serves to press said elements into frictional contact with each other.

Another object of the invention is to provide a shock absorber, as set forth in the preceding paragraph, wherein the friction elements present cooperating friction surfaces providing realtively large areas of contact, the relatively large areas of contact being had by the employment of a friction plate interposed between two relatively lengthwise slidable friction elements.

Other objects of the invention will more clearly appear from the description and claims hereinafter following.

Figure 1:
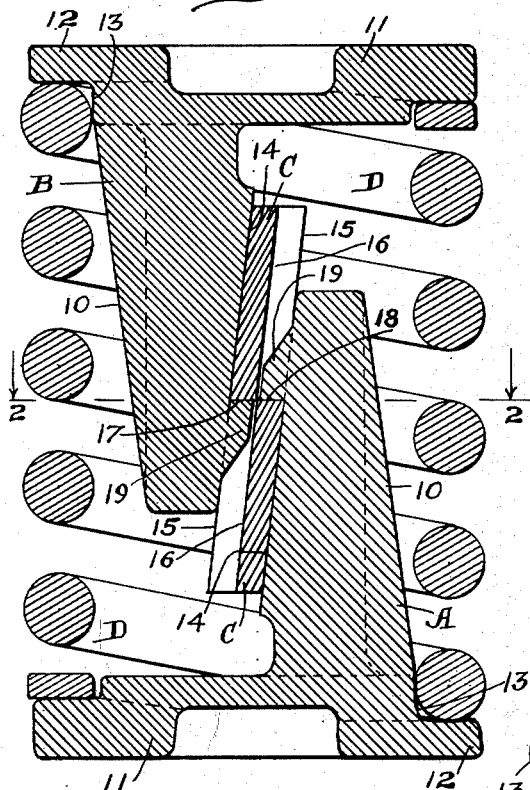
Figure 2:
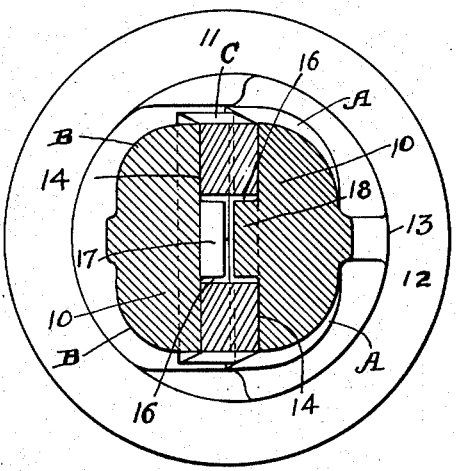
Figure 3:
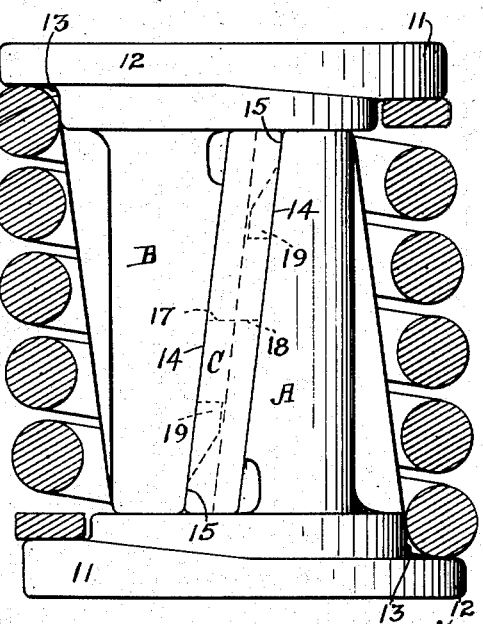
Figure 4:
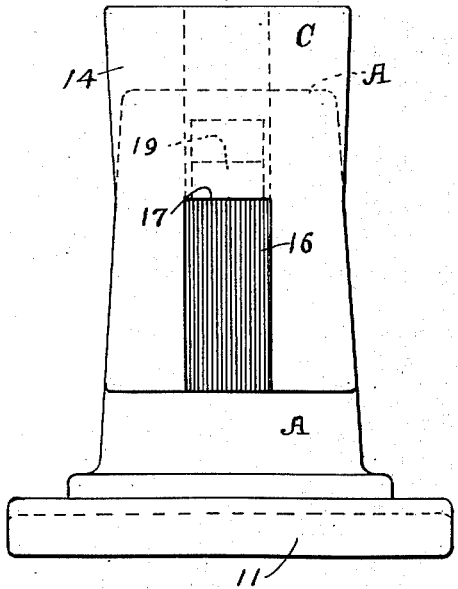

In the accompanying drawing forming a part of this specification, Figure 1 is a vertical sectional view of the improved friction shock absorber. Figure 2 is a horizontal sectional view, corresponding substantially to the line 2—2 of Figure 1. Figure 3 is a side elevational view of the mechanism shown in Figure 1, illustrating the device completely compressed or closed. Figure 4 is an elevational view of the lower friction post and the cooperating friction plate shown in Figure 1, looking from left to right in said figure.

The improved friction shock absorber, as illustrated in the drawing, comprises broadly two similar friction posts A and B, a friction plate C interposed between the posts, and a spring resistance D surrounding the posts.

The friction posts A and B are identical, each post comprising a vertically disposed, heavy plate 10 having a cylindrical base portion or member 11, eccentric thereto, and a laterally extending, annular flange 12 projecting from said base portion and forming a follower member. The peripheral cylindrical surface of the base portion 11 of the plate 10, which surface is indicated by 13, presents a substantially vertically extending abutment wall for the inner side of the corresponding end coil of the spring D. The two posts A and B are reversely arranged, that is, the post B is inverted with respect to the position of the post A. As most clearly shown in Figure 1, the flange 12 or follower member of the post A is located at the bottom end of the mechanism and has the friction plate 10 upstanding therefrom, while the flange 12 or follower member of the post B is located at the upper end of the mechanism and has the plate 10 depending therefrom.

On the inner side, the friction plate 10 of each post has a substantially flat friction surface 14 extending from end to end of the post. The friction surfaces 14—14 of the two posts A and B are inclined with respect to the central vertical axis of the device, that is, they are inclined with respect to a vertical plane, the surface 14 of the post A being inclined outwardly away from said central vertical axis in upward direction, and the surface 14 of the post B being inclined toward said vertical axis in upward direction. In the assembled condition of the mechanism, the surfaces 14—14 of the two posts are substantially parallel.

The friction plate C is interposed between the posts A and B and has longitudinally extending, flat friction surfaces 15—15 on opposite sides thereof engaging the surfaces 14—14 of the posts, respectively. The plate C is grooved lengthwise on the friction surface sides thereof, as indicated at 16—16, the groove 16 on the left hand side of said plate, as seen in Figure 1, extending upwardly from the lower end of the plate and terminating in a transverse stop shoulder 17 at the mid portion of said plate, and the groove 16 on the right hand side thereof extending downwardly from the upper end of the plate to the mid portion thereof where it terminates in a transverse stop shoulder 18.

Each of the friction posts A and B is provided with a laterally extending stop lug 19 at the outer end portion thereof, projecting from the friction surface side of the post, extending into the groove 16 at the corresponding side of the plate C, the lugs 19—19 of the posts A and B being respectively engageable with the shoulders 17 and 18 of the plate to limit lengthwise separation of the posts and maintain the mechanism assembled.

The parts of the mechanism are proportioned so that movement of the posts in lengthwise direction toward each other is positively limited by engagement of the outer end of the post B with the base portion 11 of the post A, engagement of the outer end of the post A with the base portion 11 of the post B, and engagement of the base portions of the two posts with the opposite ends, respectively, of the plate C.

The spring D, which is in the form of a helical coil, surrounds the posts A and B and bears at its top and bottom ends on the flanges 12—12 of the posts. The spring D is under initial compression and the inner sides of the top and bottom coils, at opposite sides of the mechanism, bear on the vertical walls 13—13 of the base members 11—11 of the posts A and B, that is, the inner side of the coil at the upper end of the spring bears on the wall 13 of the base member 11 of the post B at the left hand side of the mechanism, and the coil at the lower end of the spring bears on the wall 13 of the base member 11 of the post A at the right hand side of the mechanism, as seen in Figure 1.

The improved shock absorber preferably replaces one or more of the spring units of a truck spring cluster, being interposed between the usual top and bottom spring plates, which cooperate with said cluster.

The operation of the improved shock absorber is as follows: Upon the spring cluster of a truck of a railway car being compressed between the spring follower plates of the cluster, the shock absorber unit, which is disposed between said follower plates, is compressed therewith, thereby forcing the post B downwardly toward the post A, against the resistance of the spring D, the post A slipping on the plate C and the latter sliding on the post B until the parts reach the fully compressed or closed position shown in Figure 3. Due to the inclination of the cooperating friction surfaces of the posts A and B and the plates C, the posts are forced laterally outwardly during lengthwise relative movement of the same, thereby canting the spring and increasing the pressure thereof on the posts. During relative lengthwise movement of the posts A and B and the plate C on their friction surfaces, the required frictional resistance is developed to effectively snub the action of the truck springs. Upon release of the mechanism, the posts A and B and the plate C are returned to the normal position shown in Figure 1 by the expansive action of the spring D, the plate C being carried upwardly by engagement of the lug 19 of the post A therewith, and lengthwise separation of the posts being limited by engagement of the lugs 19—19 of both posts with the cooperating shoulders 17 and 18 of the plate C. As will be evident, frictional resistance is had during both compression and recoil action of the device to snub the action of the truck springs.

I claim:

1. In a friction shock absorber, the combination with a pair of relatively lengthwise movable friction posts at diametrically opposite sides of the mechanism; of a friction plate between said posts in sliding engagement with both posts; and a coil spring extending lengthwise of the mechanism and surrounding said posts, said spring bearing laterally on said posts respectively for exerting lateral inward pressure on the posts and having shouldered engagement with the posts to yieldingly oppose relative lengthwise movement thereof toward each other.

2. In a friction shock absorber, the combination with a pair of relatively lengthwise movable friction posts at diametrically opposite sides of the mechanism, said posts having lengthwise extending friction surfaces on their inner sides; of a friction plate slidable between said posts and having friction surfaces on opposite sides engaged with said surfaces of said posts, respectively; and a coil spring extending lengthwise of the mechanism and surrounding said posts, said spring exerting lateral inward pressure on said posts and having shouldered engagement with the posts to yieldingly oppose relative lengthwise movement thereof toward each other.

3. In a friction shock absorber, the combination with a pair of relatively lengthwise movable friction posts at diametrically opposite sides of the mechanism having longitudinally extending friction surfaces on their inner sides inclined to the longitudinal axis of the mechanism; of a friction plate between said posts, said plate having friction surfaces on opposite sides thereof slidingly engaged with the friction surfaces of the posts; follower means at the outer end of each post; and a coil spring surrounding said posts and bearing at opposite ends on said follower means, said spring having lateral bearing engagement with said posts at the outer end portions thereof to hold the posts in tight frictional contact with said plate.

4. In a friction shock absorber, the combination with a pair of relatively lengthwise movable friction posts at diametrically opposite sides of the mechanism; of a friction plate between said posts in sliding engagement with both posts; a lug on each post having shouldered engagement with said plate for limiting outward movement of said post with respect to said plate; and a coil spring extending lengthwise of the mechanism and surrounding said posts, said spring exerting lateral inward pressure on the posts and having shouldered engagement with the posts to yieldingly oppose relative lengthwise movement thereof toward each other.

5. In a friction shock absorber, the combination with a pair of relatively lengthwise movable friction posts at diametrically opposite sides of the mechanism, said posts having lengthwise extending friction surfaces on their inner sides; of a friction plate slidable between said posts and having friction surfaces on opposite sides engaged with said surfaces of said posts, respectively; a lug at the outer end of each post having shouldered engagement with said plate to limit movement of said posts in opposite directions with respect to said plate and restrict lengthwise separation of said posts; and a coil spring extending lengthwise of the mechanism and surrounding said posts, said spring exerting lateral inward pressure on said posts and having shouldered engagement with the posts to yieldingly oppose relative lengthwise movement thereof toward each other.

ERIC G. FORSSELL.

REFERENCES CITED

The following references are of record in the file of this patent:

UNITED STATES PATENTS

| Number | Name | Date |
|---|---|---|
| 1,169,863 | Peycke | Feb. 1, 1916 |
| 2,141,522 | Duryea | Dec. 27, 1938 |
| 2,388,230 | Light | Oct. 30, 1945 |
| 2,410,165 | Johnson et al. | Oct. 29, 1946 |
| 2,444,989 | Haseltine | July 13, 1948 |